Jan. 7, 1941.    A. M. LANGLEY    2,227,591
STUFFING BOX
Filed April 4, 1939    2 Sheets-Sheet 1
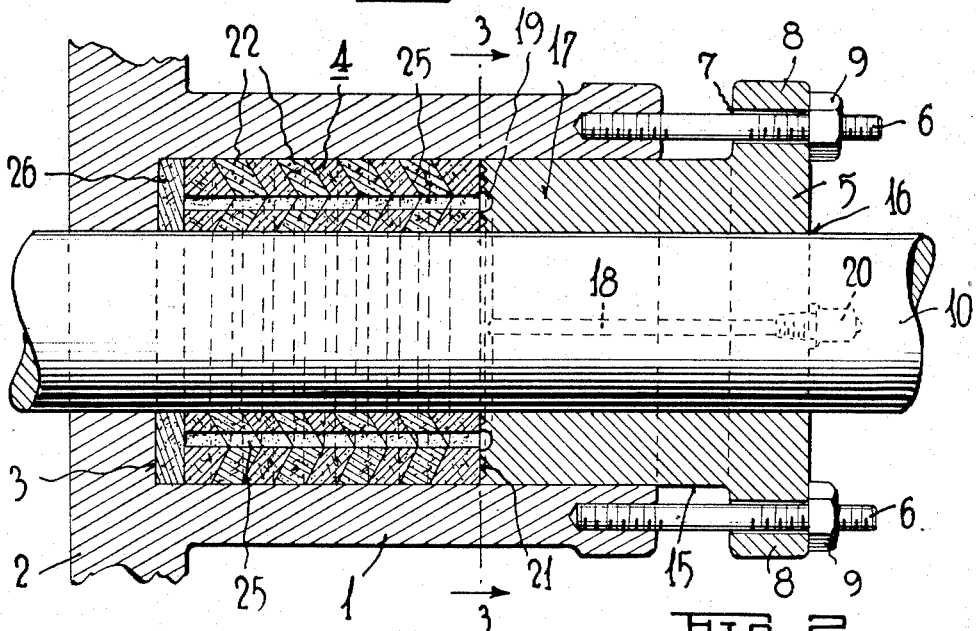
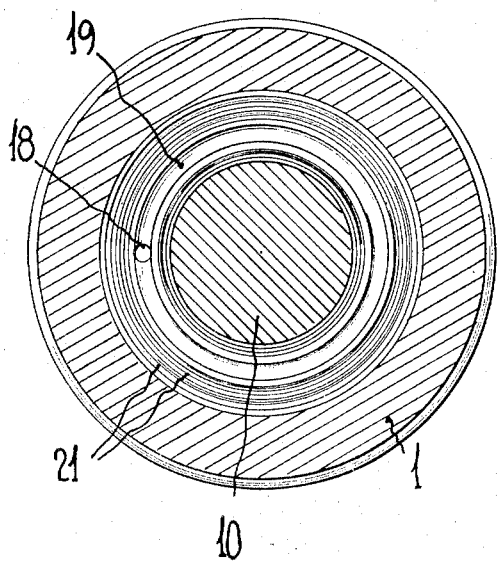
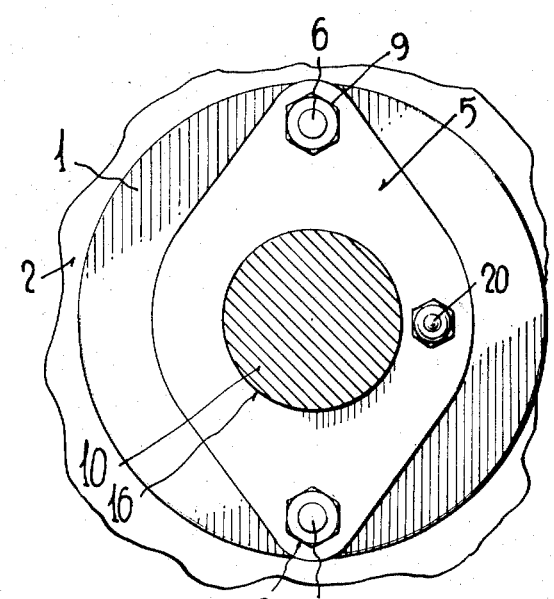
Alva M. Langley
Inventor
By J. Vincent Martin
and
Ralph R. Browning
Attorneys

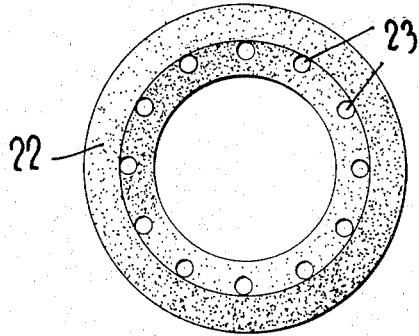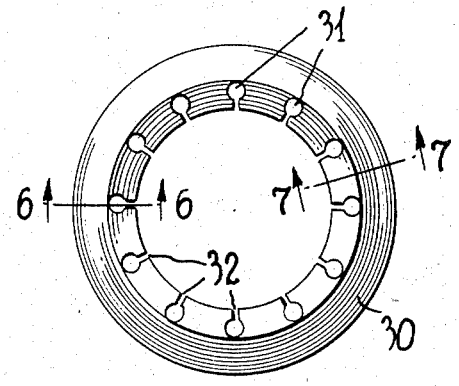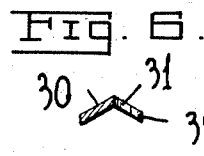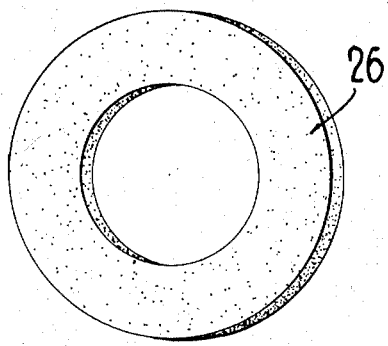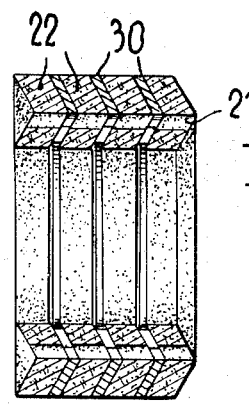

Patented Jan. 7, 1941

2,227,591

UNITED STATES PATENT OFFICE 2,227,591

STUFFING BOX

Alva M. Langley, Houston, Tex.

Application April 4, 1939, Serial No. 265,873

6 Claims. (Cl. 286—27)

This invention relates to lubricating and packing devices for shafts, and an object is to provide a device of this character which will, efficiently lubricate the shaft by continuously supplying small quantities of lubricant. Another object is to provide a device in which is embodies a packing or stuffing box which will make a tight joint with the shaft, and prevent the escape through the same of fluid.

It is to be noted that the device may be used for shafts having rotating, oscillating or reciprocating motion and may also be applied to rods or sleeves.

The invention consists in the novel features of construction hereinafter described, illustrated in the accompanying drawings and particularly pointed out in the claims.

In the accompanying drawings, Figure 1 is a view in central longitudinal section through a stuffing box embodying the invention, the piston rod being shown in elevation. Figure 2 is an end view looking toward the left in Figure 1. Figure 3 is a view in section on line 3—3 of Figure 1. Figure 4 is a plan view of one of the packing rings shown in Figure 1. Figure 5 is a plan view of one of the metal separator rings employed in a modification of the invention. Figures 6 and 7 are respectively, sectional views taken on the lines 6—6 and 7—7 of Figure 5. Figure 8 is a perspective view of the bottom packing ring shown in Figure 1, and Figure 9 is a sectional view of a modification of the packing unit employing metal separator rings.

1 designates a stuffing box which is shown as projecting from a cylinder head 2, this stuffing box being provided with a chamber 3 to receive a packing unit 4 and to receive at its outer end, a gland 5 whereby the packing unit is retained within the stuffing box.

It is to be noted that from the end of the stuffing box 1, project the threaded bolts 6 that pass through holes 7 of the laterally extending ears 8 of the gland 5, these bolts being provided with nuts 9 to retain the gland in position. Through the stuffing box 1 and the gland 5 passes the piston rod, rod or shaft 10 which is to be lubricated.

The gland 5 is of the conventional shape, old in the art, having its exterior surface 15 fashioned to fit within the stuffing box and having the internal bore 16, extending from end to end thereof. The wall portion 17 of the gland is provided with a lubricant conduit or passageway 18 leading down to and communicating with an annular distributing groove 19, which groove is formed in the end of the gland contacting the packing. The other end of the conduit 18 is fitted with a pressure lubricant fitting 20, of the well-known type. The annular groove 19 is concentrically surrounded with ridges or teeth 21 which press into the packing material and prevent the leakage of lubricant at this region.

The packing unit shown in Figure 1 is composed of a plurality of rings of packing material 22, of substantial thickness, nested together, one on top of the other, and by virtue of the V-formation given thereto, the rings are held together. In plan view, one of these rings is shown in Figure 4 and it will be seen that each ring is provided with a plurality of spaced, concentrically arranged holes or openings 23, and when these rings are nested, these holes or openings are lined up so that a plurality of complete through-channels 25 are formed, said through-channels extending longitudinally of the packing and communicating with the annular groove 19 at one end and terminating at the other end at the solid packing ring 26 which is first placed in the stuffing box. The use of this solid end packing ring is not always essential. Furthermore, it is to be noted that the end packing rings of each packing unit are flat faced so that they will bear firmly against the end of the gland and against the packing ring 26.

In use, lubricant is introduced through the fitting 20 and forced by pressure through the passageway 18, thence through the distributing groove 19 and channels 25, through and between the packing rings to the piston rod 10, which is to be lubricated.

In the modified form of packing shown in Figure 9, the packing rings are the same as those employed in Figure 1, but they are separated, each from the other by metal rings 30, somewhat thinner than the packing rings but shaped in cross-section like the packing rings so that they will nest therewith. It is to be noted also, that the internal diameter of the metal ring is greater than the internal diameter of the packing ring, so that at no time, when the packing unit is in use, will the metal of the separator rings come into contact with he metal of the rod or shaft to be lubricated.

As seen in Figure 5, the metal ring is provided with holes or openings 31, to match the holes or openings 23 in the packing ring and in addition thereto, the metal rings are notched as at 32 so that the holes 31 communicate directly with the inner surface of the ring. This provides for a direct passageway for grease or lubricant to the cooperating surfaces of the packing rings, and the rod or shaft to be lubricated. The outer diameters of the metal separator rings and the packing rings are such that they will fit snugly within the stuffing box.

From the foregoing, it will be seen that a means has been provided for carrying out all the objects and advantages sought by this invention.

I claim:

1. A renewable packing unit for stuffing boxes comprising a plurality of rings made of packing material engaging each other and held in nested relation by virtue of the V-formation given to each ring, each of said packing rings being provided with a plurality of spaced concentrically arranged openings, the openings in each ring mating with the openings in each adjacent ring to provide a plurality of channels extending longitudinally of said packing unit.

2. A renewable packing unit for stuffing boxes comprising a plurality of rings made of packing material, each ring having a V-formation in cross-section, and adapted to be nested with each other with metal separator rings of the same cross-sectional formation as said packing rings alternating between adjacent packing rings, each of said packing rings and separator rings being provided with a plurality of spaced concentrically arranged openings, the openings in each ring mating with the openings in each adjacent ring to provide a plurality of channels extending longitudinally of said packing unit, each of said separator rings being notched from its inner periphery to each of the said openings therein, the internal diameter of each of said separator rings being slightly greater than the internal diameter of each of said packing rings.

3. The combination with a stuffing box, of a lubricating gland extending within the outer portion of said stuffing box for holding packing in place about a rod to be lubricated, said gland having an annular distributing groove in the end thereof adjacent said packing, said packing comprising a plurality of rings made of packing material engaging each other and held in nested relation by virtue of a V-formation given to each ring, each of said packing rings being provided with a plurality of spaced concentrically arranged openings, the openings in each ring mating with the openings in each adjacent ring to provide a plurality of through channels, said channels communicating with said annular distributing groove, said gland having a lubricant conducting passageway extending from said distributing groove toward the end of said gland opposite from said first mentioned end, said passageway having a pressure lubricant fitting at its outer end by means of which lubricant may be forced into said distributing groove and through said channels and between said packing rings.

4. The combination with a stuffing box, of a lubricating gland extending within the outer portion of said stuffing box for holding packing in place about a rod to be lubricated, said gland having an annular distributing groove in the end thereof adjacent said packing, said packing comprising a plurality of rings made of packing material, each ring having a V-formation in cross-section, and adapted to be nested with each other with metal separator rings of the same cross-sectional formation as said packing rings alternating between adjacent packing rings, each of said packing rings and separator rings being provided with a plurality of spaced concentrically arranged openings, the openings in each ring mating with the openings in each adjacent ring to provide a plurality of through channels, each of said separator rings being notched from its inner surface to each of said channels, the internal diameter of each of said separator rings being slightly greater than the internal diameter of each of said packing rings, said channels communicating with said annular distributing groove, said gland having a lubricant conducting passageway extending from said distributing groove to the end of said gland opposite from said first mentioned end, said passageway having a pressure lubricant fitting at its outer end by means of which lubricant may be forced into said distributing groove and through said channels and between said packing rings.

5. The combination with a stuffing box, of a lubricating gland extending within the outer portion of said stuffing box for holding packing in place about a rod to be lubricated, said packing comprising a plurality of rings engaging each other, each ring being provided with an axial opening, said openings being in communication with each other, when the rings are assembled, so as to form a passage extending longitudinally of the packing, said gland having a lubricant conduit extending from the end adjacent the packing outwardly toward the other end, said conduit communicating with said passage, and means whereby lubricant may be forced under pressure through said conduit into said passage, and thence radially inwardly between said rings to said rod.

6. The combination with a stuffing box, of a lubricating gland extending within the outer portion of said stuffing box for holding packing in place about a rod to be lubricated, said packing comprising a plurality of rings engaging each other, each ring being provided with an axial opening, said openings being alined, when the rings are assembled, so as to form a channel extending longitudinally of the packing parallel with said rod, some of said rings having radial notches extending from their inner periphery to said channel, said gland having a lubricant conduit extending from the end adjacent the packing outwardly toward the other end, said conduit communicating with said channel, and means whereby lubricant may be forced under pressure through said conduit into said channel, and thence radially inwardly through said notches to said rod.

ALVA M. LANGLEY.